US012046208B2

(12) United States Patent
Kim et al.

(10) Patent No.: US 12,046,208 B2
(45) Date of Patent: Jul. 23, 2024

(54) CURRENT CONTROL INTEGRATED CIRCUIT OF BACKLIGHT DEVICE FOR DISPLAY

(71) Applicants: GLOBAL TECHNOLOGIES CO., LTD, Hwaseong-si (KR); Min Seon Kim, Hwaseong-si (KR); Yong Geun Kim, Hwaseong-si (KR)

(72) Inventors: Min Seon Kim, Hwaseong-si (KR); Yong Geun Kim, Suwon-si (KR)

(73) Assignee: GLOBAL TECHNOLOGIES CO., LTD, Hwaseong-si (KR)

( * ) Notice: Subject to any disclaimer, the term of this patent is extended or adjusted under 35 U.S.C. 154(b) by 0 days.

(21) Appl. No.: 17/779,867

(22) PCT Filed: Nov. 22, 2021

(86) PCT No.: PCT/KR2021/017187

§ 371 (c)(1),
(2) Date: May 25, 2022

(87) PCT Pub. No.: WO2022/119206

PCT Pub. Date: Jun. 9, 2022

(65) Prior Publication Data

US 2024/0161708 A1 May 16, 2024

(30) Foreign Application Priority Data

Dec. 1, 2020 (KR) ........................ 10-2020-0165639
Jul. 7, 2021 (KR) ........................ 10-2021-0088911

(51) Int. Cl.
*G09G 3/34* (2006.01)
*G09G 3/32* (2016.01)

(52) U.S. Cl.
CPC ............. *G09G 3/3426* (2013.01); *G09G 3/32* (2013.01); *G09G 2300/0408* (2013.01); (Continued)

(58) Field of Classification Search
CPC ................... G09G 3/3426; G09G 3/32; G09G 2300/0408; G09G 2300/0842; (Continued)

(56) References Cited

U.S. PATENT DOCUMENTS 10,535,296 B2 * 1/2020 Sakariya .............. G09G 3/2088
10,769,995 B2 * 9/2020 Min ..................... G09G 3/3258
(Continued)

FOREIGN PATENT DOCUMENTS

KR 10-1999-0062856 7/1999
KR 10-2006-0099315 9/2006
(Continued)

*Primary Examiner* — Vijay Shankar
(74) *Attorney, Agent, or Firm* — KILE PARK REED & HOUTTEMAN PLLC

(57) ABSTRACT

A current control integrated circuit of a backlight device for display includes a buffer configured to receive a column signal; a plurality of driving current controllers configured to receive the column signal outputted from the buffer and row signals corresponding to a plurality of light emitting blocks of a control unit, and control driving currents for light emission of the light emitting blocks, in response to the column signal and the row signals; and a memory unit, wherein an offset voltage of the buffer is controlled by offset correction data stored in the memory unit.

27 Claims, 12 Drawing Sheets

(52) U.S. Cl.
CPC ............... *G09G 2300/0842* (2013.01); *G09G 2310/0291* (2013.01); *G09G 2310/0294* (2013.01); *G09G 2320/0233* (2013.01); *G09G 2320/0247* (2013.01)

(58) Field of Classification Search
CPC ... G09G 2310/0291; G09G 2310/0294; G09G 2320/0233; G09G 2320/0247
See application file for complete search history.

(56) References Cited

U.S. PATENT DOCUMENTS

| | | | | |
|---|---|---|---|---|
| 11,056,041 B2 * | 7/2021 | Sakariya | .................. | G09G 3/32 |
| 11,568,789 B2 * | 1/2023 | Sakariya | .................. | G09G 3/32 |
| 2011/0249036 A1 * | 10/2011 | Kim | .................. | H05B 45/3725 |
| | | | | 345/690 |

FOREIGN PATENT DOCUMENTS

| | | |
|---|---|---|
| KR | 10-2011-0114075 | 10/2011 |
| KR | 10-2014-0086174 | 7/2014 |
| KR | 10-2015-0073694 | 7/2015 |
| KR | 10-2016-0130077 | 11/2016 |
| KR | 10-2018-0004247 | 1/2018 |
| KR | 10-2018-0049747 | 5/2018 |
| KR | 10-2020-0097940 | 8/2020 |
| WO | 2016/038855 | 3/2016 |

* cited by examiner

C11 C12 C13 C14

| | D1 | D2 | D3 | D4 |
|---|---|---|---|---|
| G1 | 4 | 5 | 1 | 2 |
| G2 | 3 | 1 | 5 | 5 |
| G3 | 1 | 5 | 2 | 3 |
| G4 | 5 | 3 | 0 | 2 |
| G5 | 2 | 5 | 0 | 4 |
| G6 | 4 | 1 | 1 | 5 |
| G7 | 1 | 0 | 3 | 0 |
| G8 | 5 | 3 | 0 | 2 |
| G9 | 3 | 2 | 5 | 1 |

CURRENT CONTROL INTEGRATED CIRCUIT OF BACKLIGHT DEVICE FOR DISPLAY

CROSS-REFERENCE TO RELATED APPLICATION

This application is a national entry of International Application No. PCT/KR2021/017187, filed on Nov. 22, 2021, which claims under 35 U.S.C. § 119(a) and 365(b) priority to and benefits of Korean Patent Application No. 10-2020-0165639 filed on Dec. 1, 2020, and Korean Patent Application No. 10-2021-0088911 filed on Jul. 7, 2021 in the Korean Intellectual Property Office, the entire contents of which are incorporated herein by reference.

TECHNICAL FIELD

The present disclosure relates to a current control integrated circuit, and more particularly, to a current control integrated circuit of a backlight device for the display of an image.

BACKGROUND ART

Among display panels, for example, an LCD panel requires a backlight device for the display of an image.

The backlight device may provide backlight for displaying an image on the LCD panel. The LCD panel may display an image using backlight by performing an optical shutter operation in each pixel.

The backlight device may include a backlight board. The backlight board may include light emitting diode channels which use LEDs as light sources, and the light emitting diode channels may emit light to provide backlight.

The backlight board may include the light emitting diode channels to realize backlight having a resolution different from that of an image of the LCD panel, and the light emission of the light emitting diode channels may be controlled by column signals and row signals.

A conventional backlight device which performs dimming control is difficult to maintain uniform and low luminance light emission during one frame. If the light emitting diode channel does not sufficiently maintain light emission for one frame, flicker may occur. Therefore, the backlight device needs to adopt a design for reducing or preventing flicker.

The backlight device is configured to use a large number of light emitting diode channels. The light emitting diode channels of the backlight device have current deviations for the same column signal.

The current deviation of the light emitting diode channel may be caused by a deviation in an offset voltage acting on the column signal.

In addition, it may be understood that the current deviation of the light emitting diode channel is caused by a deviation in the gain of a dependent current source which drives the driving current of the light emitting diode channel.

The light emitting diode channels may emit light with different brightnesses even with the same column signal due to the current deviations.

The current deviation may be large at a low current of 20 uA to 200 uA, which is controlled with respect to an input value of a low voltage of 1 mV to 100 mV.

This is because a deviation in the offset voltage and a deviation in the gain of the dependent current source have greater influences on a current deviation as a light emission driving voltage is low.

Therefore, the current deviation may be relatively larger in a low current band in which the light emission driving voltage is low than a high current band in which the light emission driving voltage is high.

Uniformity of the image quality of the backlight device, which is sensitive to the human vision, may be evaluated as gray uniformity and dark uniformity darker than the gray uniformity.

The gray uniformity and the dark uniformity are evaluated in the low current band. Therefore, the current deviation of the light emitting diode channel due to a deviation in the offset voltage and a deviation in the gain of the dependent current source may serve as a cause of deteriorating the gray uniformity and the dark uniformity.

DISCLOSURE

Technical Problem

Various embodiments are directed to a current control integrated circuit of a backlight device for display, in which the light emission of each light emitting diode channel for backlight may be maintained for one frame in order to reduce or prevent flicker.

Various embodiments are directed to a current control integrated circuit of a backlight device for display, capable of dividing light emitting diode channels of a backlight board into a plurality of control units and controlling driving currents of light emitting diode channels of each control unit.

Various embodiments are directed to a current control integrated circuit of a backlight device for display, which reduces a current deviation of a light emitting diode channel occurring relatively large in a low current band, in particular, a current deviation due to an offset voltage deviation for a light emitting diode channel driving section.

Various embodiments are directed to a current control integrated circuit of a backlight device for display, which reduces a current deviation of a light emitting diode channel acting relatively greatly in a low current band, in particular, prevents a current deviation due to a deviation in the gain of a dependent current source contributing to the driving current of the light emitting diode channel.

Technical Solution

In an embodiment, a current control integrated circuit of a backlight device for display may include: a buffer configured to receive a column signal, and including an offset controller; a plurality of driving current controllers configured to receive the column signal outputted from the buffer and row signals corresponding to a plurality of light emitting blocks of a control unit, and control driving currents for light emission of the light emitting blocks; and a memory unit configured to store offset correction data for controlling a deviation in an offset voltage of the buffer, wherein each driving current controller generates a sampling voltage by sampling the column signal by using the row signal, and controls the driving current of the light emitting block by using the sampling voltage, wherein the offset controller controls the offset voltage in response to the offset correction data, and wherein the buffer has the offset voltage which is controlled by the offset controller, and provides the column signal from which the offset voltage is subtracted, to the plurality of driving current controllers.

In an embodiment, a current control integrated circuit of a backlight device for display may include: a buffer configured to receive a column signal; a plurality of driving current controllers configured to receive the column signal outputted from the buffer and row signals corresponding to a plurality of light emitting blocks of a control unit and to control driving currents for light emission of the light emitting blocks, and each including a dependent current source which controls the driving current; and a memory unit configured to store gain correction data for controlling a deviation in a gain of the dependent current source, wherein each driving current controller generates a sampling voltage by sampling the column signal by using the row signal, and controls the driving current of the light emitting block by using the sampling voltage, and wherein the dependent current source controls an amount of the driving current in response to a gain.

In an embodiment, a current control integrated circuit of a backlight device for display may include: a plurality of buffers configured to receive in common a column signal, and each including an offset controller; a plurality of driving current controllers configured in correspondence to the plurality of buffers, and configured to receive the column signal outputted from the corresponding buffers and row signals corresponding to a plurality of light emitting blocks of a control unit, and control driving currents for light emission of the light emitting blocks; and a memory unit configured to store offset correction data for controlling deviations in offset voltages of the plurality of buffers, wherein each driving current controller generates a sampling voltage by sampling the column signal by using the row signal, and controls the driving current of the light emitting block by using the sampling voltage, and wherein the offset controller controls the offset voltage in response to the offset correction data, and wherein each buffer has the offset voltage which is controlled by the offset controller, and provides the column signal from which the offset voltage is subtracted, to the driving current controller.

Advantageous Effects

The present disclosure may provide backlight to a display panel, and driving currents of light emitting diode channels may be controlled to maintain light emission for one frame by a sampling voltage of a column signal. Therefore, the present disclosure may sufficiently maintain the light emission of the light emitting diode channels for backlight, and thus, may reduce or prevent flicker.

Also, the present disclosure divides the light emitting diode channels of a backlight board into a plurality of control units, and includes a current control integrated circuit for each control unit. Therefore, in the present disclosure, driving currents for light emission may be controlled in each control unit, and the design and fabrication of the backlight board for controlling the driving currents of the light emitting diode channels may be made easy by the application of the current control integrated circuit.

Further, the present disclosure may prevent the current deviation of the light emitting diode channel due to a deviation in an offset voltage acting relatively greatly in a low current band and a deviation in the gain of a current source contributing to an output current, thereby improving gray uniformity and dark uniformity evaluated in the low current band.

In addition, the present disclosure may store offset correction data and gain correction data in a storage section, and may compensate the driving current of the light emitting diode channel by the offset correction data and the gain correction data, thereby causing the light emission of the light emitting diode channels of a backlight device in a state in which the current deviations of the light emitting diode channels are compensated for.

MODE FOR DISCLOSURE

Figure 1:
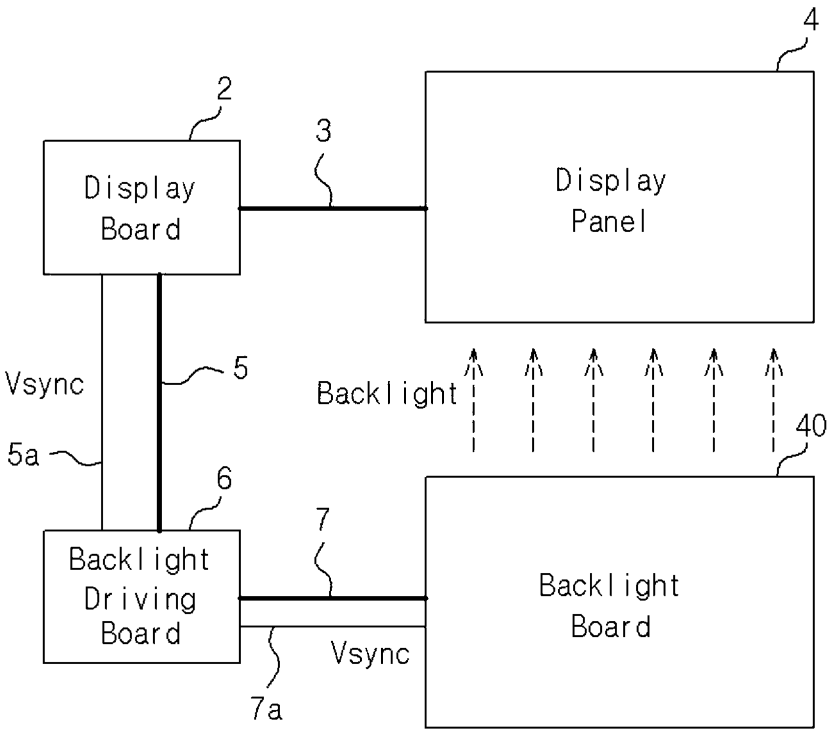
FIG. 1 is a block diagram illustrating a backlight device for display in accordance with an embodiment of the present disclosure.

Hereinafter, embodiments of the disclosure will be described in detail with reference to the accompanying drawings. The terms used herein and in the claims shall not be construed as being limited to general or dictionary meanings and shall be interpreted as the meanings and concepts corresponding to technical aspects of the disclosure.

Embodiments described herein and configurations illustrated in the drawings are preferred embodiments of the disclosure, but do not represent all of the technical features of the disclosure. Thus, there may be various equivalents and modifications that can be made thereto at the time of filing the present application.

A backlight device for display in accordance with an embodiment of the present disclosure provides backlight to a display panel for the display of an image, and is implemented to include a backlight board for providing of backlight.

The backlight board in accordance with the embodiment of the present disclosure is implemented to include current control integrated circuits to reduce or prevent flicker by backlight.

As illustrated in FIG. 1, a display apparatus for the display of an image may be exemplified as including a display board 2, a display panel 4, a backlight driving board 6 and a backlight board 40.

It may be understood that a configuration for providing backlight basically includes the backlight board 40 and additionally includes at least one of the backlight driving board 6 and the display board 2.

The display panel 4 may be configured using an LCD panel.

The display panel 4 interfaces with the display board 2 through a transmission line 3, and receives display data. The display panel 4 may include pixels (not illustrated) for realizing a pre-designed resolution, and may display an image using backlight as each pixel performs an optical shutter operation in correspondence to display data.

The display data provided to the display panel 4 may include data for displaying an image by the unit of frame. For example, the display data may include data which indicates the brightness of each pixel, a horizontal sync signal which identifies a horizontal line, a vertical sync signal which identifies a frame, and so forth.

The display board 2 receives display data transmitted from a video source (not illustrated).

The display board 2 may include parts (not illustrated) which configure display data as packets and provide the packets to the display panel 4, and may provide display data for displaying an image, to the display panel 4.

The parts which configure display data as packets and provide the packets to the display panel 4 are to realize the function of a timing controller which is generally adopted in a display apparatus, and description thereof will be omitted.

The display board 2 may provide luminance data corresponding to display data, to the backlight driving board 6.

The resolution of the display panel 4 for expressing an image and the resolution of the backlight board 40 which provides backlight are different from each other. Also, a gray range and a gray value for backlight may be set to be different from those for expressing an image. Therefore, the backlight board 40 requires backlight data including a resolution and a gray value for expressing backlight.

A plurality of horizontal periods are included in one frame of the backlight of the backlight board 40, and each horizontal period means a period in which backlight data is provided to columns of one horizontal line in one frame. Backlight data includes column data corresponding to columns of horizontal periods included in one frame and row data for identifying the horizontal periods.

The display board 2 may generate luminance data satisfying the resolution and gray value of backlight, by using display data. For example, the display board 2 may provide display data as luminance data as it is, or may provide luminance data obtained by converting display data to have a resolution and a gray value corresponding to backlight.

The display board 2 is configured to generate luminance data configured in a format which can be received by the backlight driving board 6 and provide the luminance data to the backlight driving board 6 through a transmission line 5. The display board 2 may provide a vertical sync signal Vsync to the backlight driving board 6 through a transmission line 5*a*, for synchronization of the backlight driving board 6.

The backlight driving board 6 is configured to receive the luminance data and the vertical sync signal Vsync from the display board 2, provide backlight data to the backlight board through a transmission line 7 having a plurality of transmission channels, and provide the vertical sync signal Vsync to the backlight board 40 through a transmission line 7*a*.

The backlight board 40 is configured to receive the backlight data and the vertical sync signal Vsync of the backlight driving board 6, and provide backlight to the display panel 4 by causing the light emission of light emitting diode channels in correspondence to the backlight data.

Figure 2:
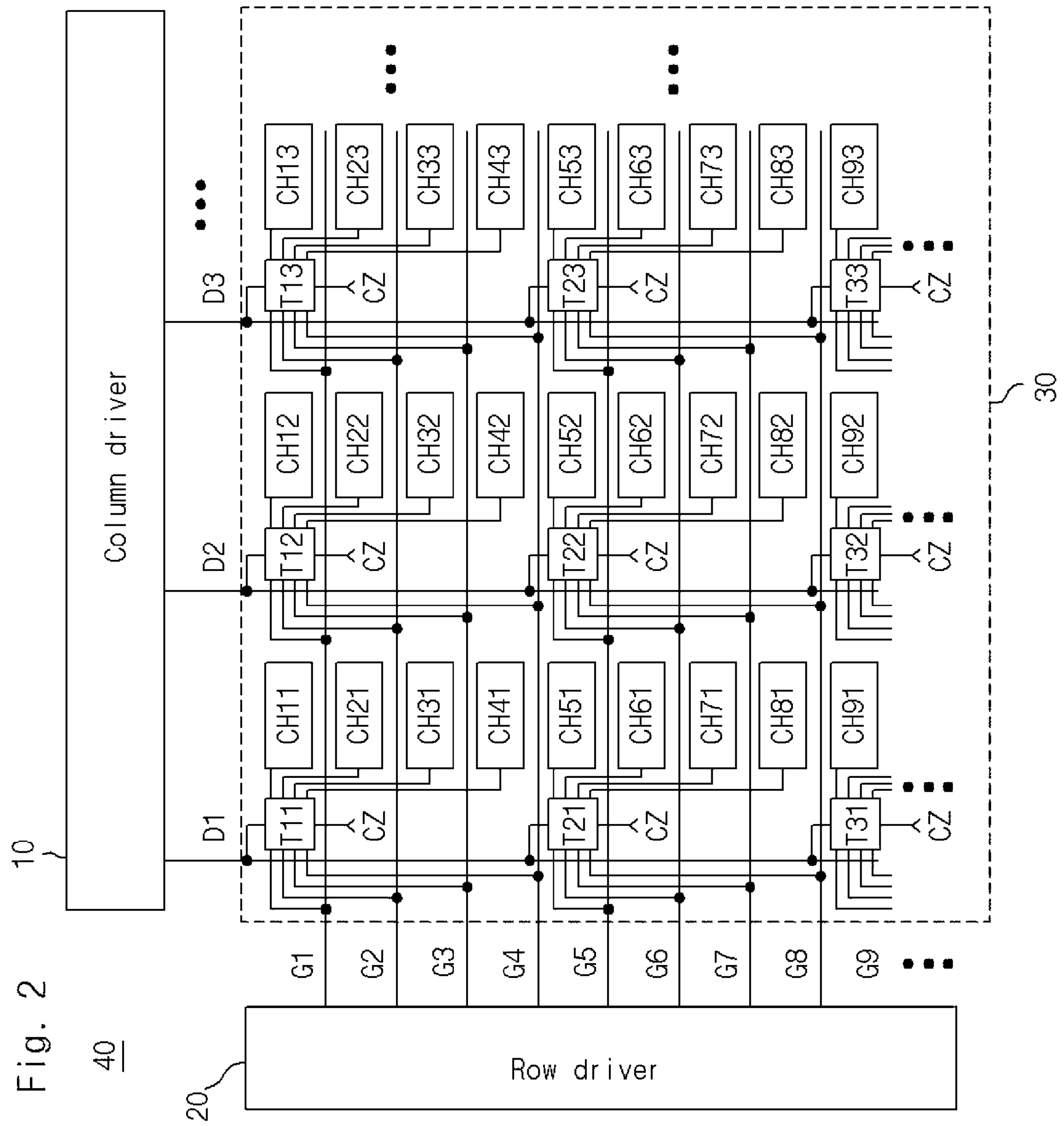
FIG. 2 is a block diagram illustrating a partial configuration of a backlight board included in the embodiment of FIG. 1.

The backlight board 40 may be implemented as illustrated in FIG. 2 to provide backlight. Referring to FIG. 2, the backlight board 40 may include a column driver 10, a row driver 20, light emitting diode channels and current control integrated circuits.

A region in which the light emitting diode channels and the current control integrated circuits are formed may be defined as a backlight region 30, and the column driver 10 and the row driver 20 may be formed outside the backlight region 30.

In FIG. 2, the light emitting diode channels are denoted by CH11 to CH93, and the current control integrated circuits are denoted by T11, T12, T13, T21, T22, T23, T31, T32 and T33.

The backlight board 40 is to provide backlight for the display of an image to the display panel 4, and the backlight region 30 may be understood as a region which provides backlight by the light emission of the light emitting diode channels CH11 to CH93.

By the above configuration, the backlight board 40 is configured to serve as a surface light source by a set of light sources.

The backlight board 40 of FIG. 2 includes the light emitting diode channels CH11 to CH93 which use LEDs as light sources. The light emitting diode channels CH11 to CH93 may be disposed as a matrix structure having columns and rows. Each of the light emitting diode channels CH11 to CH93 may be understood as including a plurality of LEDs which are connected in series.

According to the embodiment of the present disclosure, the light emitting diode channels CH11 to CH93 are divided into a plurality of control units. In the embodiment, the control unit may be defined as including a predetermined number of light emitting diode channels which are continuously disposed on the same column or a predetermined number of light emitting diode channels which are distributed in each of a plurality of columns and are continuously disposed on each of the plurality of columns.

For example, it may be defined that all the light emitting diode channels CH11 to CH93 are divided by the unit of four light emitting diode channels which are continuously disposed on the same column and the control unit includes four light emitting diode channels which are divided in this way.

That is, the light emitting diode channels CH11, CH21, CH31 and CH41, the light emitting diode channels CH51, CH61, CH71 and CH81, the light emitting diode channels CH12, CH22, CH32 and CH42, the light emitting diode channels CH52, CH62, CH72 and CH82, the light emitting diode channels CH13, CH23, CH33 and CH43, and the light emitting diode channels CH53, CH63, CH73 and CH83 are divided as control units, respectively.

The embodiment of the present disclosure includes the current control integrated circuits T11, T12, T13, T21, T22, T23, T31, T32 and T33 each corresponding to one control unit. That is to say, the current control integrated circuits T11, T12, T13, T21, T22, T23, T31, T32 and T33 of FIG. 2 are configured on the backlight board 40 to one-to-one correspond to the control units of all the light emitting diode channels CH11 to CH93.

In detail, the current control integrated circuit T11 is configured to control driving currents of the light emitting diode channels CH11, CH21, CH31 and CH41, the current control integrated circuit T21 is configured to control driving currents of the light emitting diode channels CH51, CH61, CH71 and CH81, the current control integrated circuit T12 is configured to control driving currents of the light emitting diode channels CH12, CH22, CH32 and CH42, the current control integrated circuit T22 is configured to control driving currents of the light emitting diode channels CH52, CH62, CH72 and CH82, the current control integrated circuit T13 is configured to control driving currents of the light emitting diode channels CH13, CH23, CH33 and CH43, and the current control integrated circuit T23 is configured to control driving currents of the light emitting diode channels CH53, CH63, CH73 and CH83.

The current control integrated circuits T11, T12, T13, T21, T22, T23, T31, T32 and T33 are configured to receive column signals from the column driver 10 and receive row signals from the row driver 20. The column signals are denoted by D1, D2, D3, . . . , and the row signals are denoted by G1, G2, G3, . . . .

One backlight board 40 provides backlight having a resolution determined by all the light emitting diode channels CH11 to CH93, and is configured to be controlled in its brightness by data corresponding to one frame of backlight. The data corresponding to one frame of backlight includes data of a plurality of horizontal periods.

The column driver 10 is configured to provide column signals corresponding to each horizontal period of backlight. For example, the column driver 10 provides the column signals D1, D2, D3, . . . corresponding to the columns of the light emitting diode channels, by the unit of horizontal period. Signal lines to which the column signals D1, D2, D3, . . . are applied may be referred to as column lines.

The column driver 10 receives column data having a value for expressing brightness, and provides the column signals D1, D2 and D3 having voltage levels corresponding to the column data.

The row driver 20 receives row data, and is configured to provide the row signals G1, G2, . . . and G9 corresponding to the rows of the light emitting diode channels by the unit of one frame of backlight in correspondence to the row data. The row signals G1, G2, . . . and G9 have a preset pulse width, and are sequentially provided according to the horizontal periods of backlight. Signal lines to which the row signals G1, G2, . . . and G9 are applied may be referred to as row lines.

Each of the current control integrated circuits T11, T12, T13, T21, T22, T23, T31, T32 and T33 receives a column signal and row signals of a control unit corresponding to it.

To this end, the current control integrated circuits T11, T21 and T31 share one column line to receive the column signal D1, the current control integrated circuits T12, T22 and T32 share one column line to receive the column signal D2, and the current control integrated circuits T13, T23 and T33 share one column line to receive the column signal D3.

Each of the current control integrated circuits T11, T12, T13, T21, T22, T23, T31, T32 and T33 receives row signals of a corresponding control unit. The current control integrated circuits T11, T12 and T13; T21, T22 and T23; and T31, T32 and T33 of the same row positions receive the same row signals and share row lines.

Each of the current control integrated circuits T11, T12, T13, T21, T22, T23, T31, T32 and T33 receives, as described above, a column signal and row signals corresponding to a control unit, and controls the driving currents of the light emitting diode channels of the control unit, thereby controlling the light emission of the light emitting diode channels. For example, as described above, the current control integrated circuit T11 receives the column signal D1, receives the row signals G1 to G4, and controls the driving currents of the light emitting diode channels CH11, CH21, CH31 and CH41, thereby controlling the light emission of the light emitting diode channels CH11, CH21, CH31 and CH41.

Each of the current control integrated circuits T11, T12, T13, T21, T22, T23, T31, T32 and T33 may generate sampling voltages by sequentially sampling a column signal for respective horizontal periods by row signals, and by the sampling voltages, may control the light emission and maintenance of brightness of the light emitting diode channels of a control unit. For example, the current control integrated circuit T11 generates sampling voltages by sampling the column signal D1 for respective horizontal periods by the row signals G1 to G4 for the respective horizontal periods, which are sequentially provided, and by the sampling voltages, controls driving currents for the light emission of the light emitting diode channels CH11, CH21, CH31 and CH41 belonging to the same control unit.

Each of the current control integrated circuits T11, T12, T13, T21, T22, T23, T31, T32 and T33 may receive a zoom control signal CZ for controlling a driving current. Description of the zoom control signal CZ will be made later.

Figure 3:
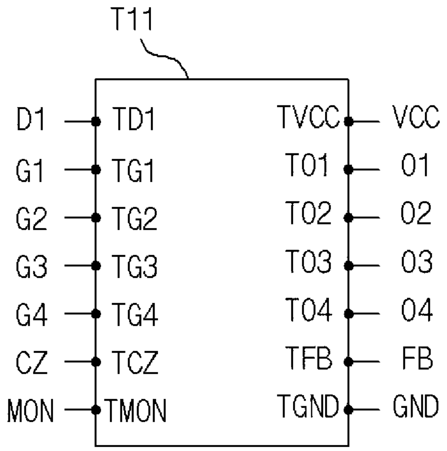
FIG. 3 is a block diagram illustrating a current control integrated circuit of FIG. 2.

Each of the current control integrated circuits T11, T12, T13, T21, T22, T23, T31, T32 and T33 configured as in FIG. 2 may be illustrated in detail as in FIG. 3. FIG. 3 illustrates the current control integrated circuit T11.

In FIG. 3, the current control integrated circuit T11 is illustrated as including a column input terminal TD1, row input terminals TG1 to TG4, a zoom input terminal TCZ, a monitor terminal TMON, a ground terminal TGND, an operating voltage terminal TVCC, a feedback terminal TFB, and control terminals T01 to TO4. The column input terminal TD1 receives the column signal D1, the row input terminals TG1 to TG4 receive the row signals G1 to G4, the zoom input terminal TCZ receives the zoom control signal CZ, the monitor terminal TMON outputs a monitor signal MON, the ground terminal TGND is connected to a ground GND, the operating voltage terminal TVCC is provided with an operating voltage VCC, the feedback terminal TFB outputs a feedback signal FB, and the control terminals 101 to TO4 receive driving currents O1 to O4 of the light emitting diode channels CH11, CH21, CH31 and CH41.

Figure 4:
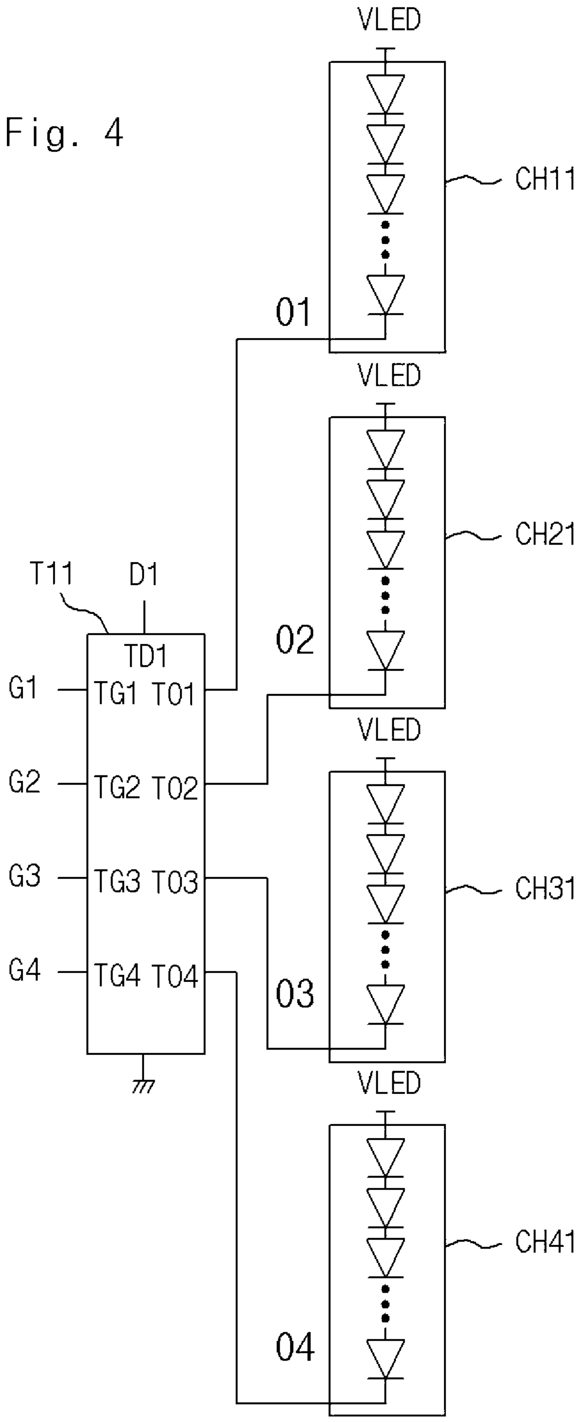
FIG. 4 is a block diagram illustrating an electrical connection relationship between the current control integrated circuit and light emitting diode channels.

Electrical connection between the current control integrated circuit T11 of FIG. 3 and the light emitting diode channels CH11, CH21, CH31 and CH41 corresponding to a control unit may be understood with reference to FIG. 4.

Each of the light emitting diode channels CH11, CH21, CH31 and CH41 is applied with a light emission voltage VLED, and includes a plurality of LEDs which are connected in series. The driving currents O1 to O4 of the low sides of the respective light emitting diode channels CH11, CH21, CH31 and CH41 are inputted to the current control integrated circuit T11.

The configurations of the remaining current control integrated circuits T12, T13, T21, T22, T23, T31, T32 and T33 may also be understood with reference to FIGS. 3 and 4.

Figures 5, 6:
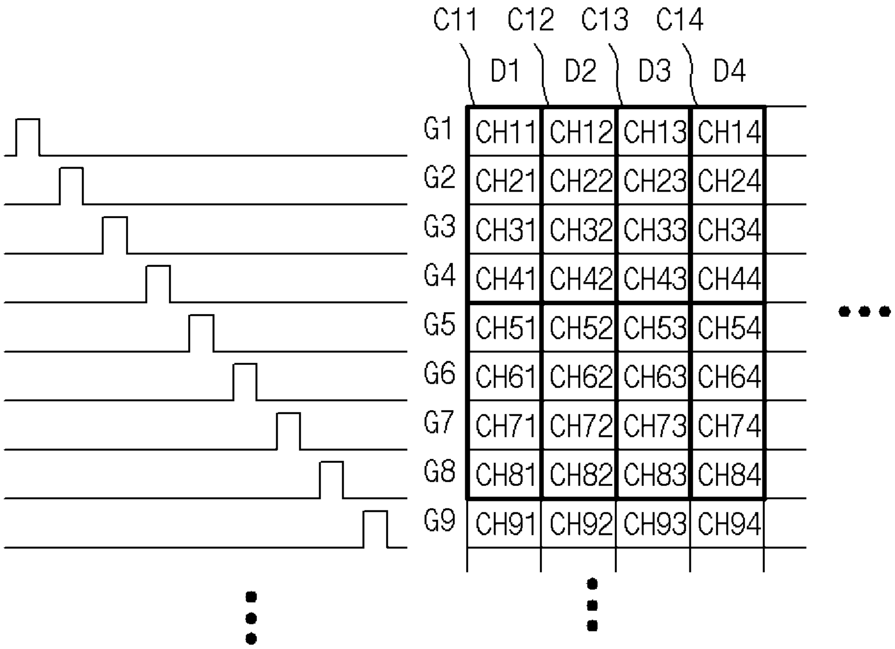
FIG. 5 is a diagram illustrating the disposition of light emitting diode channels and control units.
FIG. 6 is a diagram illustrating brightnesses of column signals applied to the light emitting diode channels.

FIG. 5 is a diagram illustrating the disposition of light emitting diode channels and the identification of control units. FIG. 5 illustrates a control unit C11 including the light emitting diode channels CH11, CH21, CH31 and CH41, a control unit C12 including the light emitting diode channels CH12, CH22, CH32 and CH42, a control unit C13 including the light emitting diode channels CH13, CH23, CH33 and CH43, and a control unit C14 including the light emitting diode channels CH14, CH24, CH34 and CH44.

One column signal and four row signals are inputted to each control unit. Column signals applied to respective light emitting diode channels may be provided to have voltage levels for brightnesses as in FIG. 6.

In detail, FIG. 6 illustrates that the column signals D1, D2, D3 and D4 are provided at levels of "4, 5, 1, 2", respectively, in a first horizontal period in which the row signal G1 is provided and are provided at levels of "3, 1, 5, 5", respectively, in a second horizontal period in which the row signal G2 is provided. The value of each level of FIG. 6 may be understood as an exemplary numerical value for expressing not an actual voltage level but an amplitude. The value of each column signal is exemplified as being represented among eight levels divided into ranges of 0 to 7. The value of each column signal may be represented as various levels depending on a resolution for expressing a brightness, and may be represented as a resolution such as of sixteen levels, thirty-two levels or sixty-four levels, for example.

The embodiment of the present disclosure may be operated by column signals and row signals provided as in FIGS. 5 and 6. The sampling of a column signal by row signals according to the embodiment of the present disclosure may be understood with reference to FIG. 7.

Figure 7:
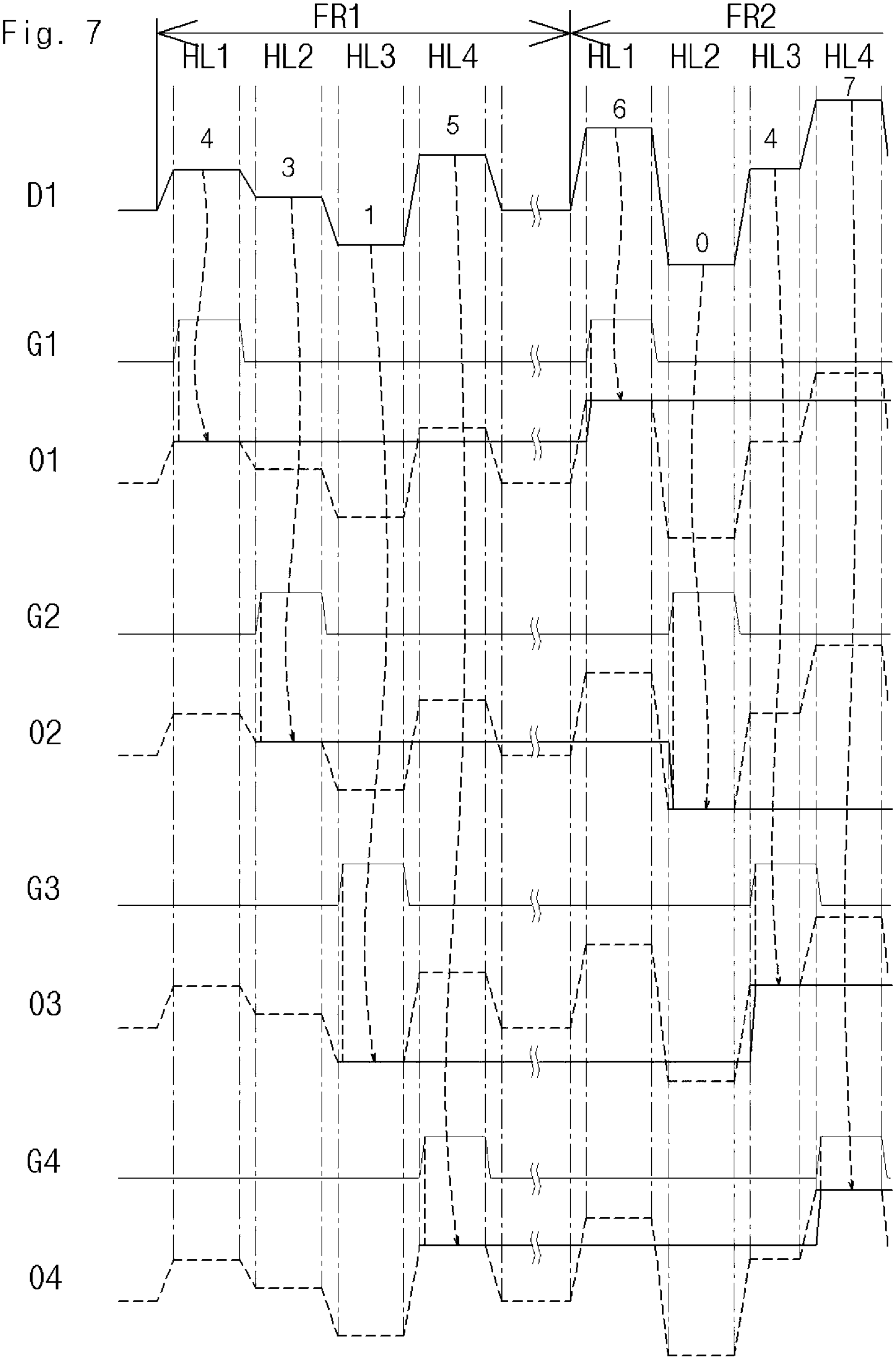
FIG. 7 is a waveform diagram for explaining an example of an operation of the current control integrated circuit.

In FIG. 7, each of FR1 and FR2 indicates a frame period of backlight, each of HL1 to HL4 indicates a horizontal period of backlight, D1 indicates the column signal, and G1 to G4 indicate the row signals. "4, 3, 1, 5" of the column signal D1 indicate levels, that is, amplitudes, of the column signal D1 indicated in FIG. 6.

In this case, the embodiment of the present disclosure controls a driving current by a level, that is, an amplitude, of a column signal being a pulse, and this may be understood as that a driving current is controlled by pulse amplitude modulation (PAM).

FIG. 7 is a waveform diagram for explaining an operation of the current control integrated circuit according to PAM.

Referring to FIG. 7, the column signal D1 is provided at the level "4" to the current control integrated circuit T11 in the horizontal period HL1 of the frame FR1, and the row signal G1 is provided at a level (e.g., "high") for sampling in the horizontal period HL1. In this case, the current control integrated circuit T11 generates a sampling voltage by sampling the column signal D1 having the level "4" by using the row signal G1, and controls the driving current O1, having the level "4" corresponding to the level of the sampling voltage, to flow through the light emitting diode channel CH11 for light emission. The sampling voltage of the current control integrated circuit T11 is maintained till the horizontal period HL1 of the next frame FR2. Therefore, the current control integrated circuit T11 maintains the driving current O1 of the light emitting diode channel CH11 having the level "4" till the horizontal period HL1 of the next frame FR2.

The column signal D1 is changed to the levels "3," "1" and "5" in correspondence to the horizontal periods HL2, HL3 and HL4, which sequentially follow the horizontal period HL1. The current control integrated circuit T11 generates sampling voltages by sampling the column signal D1 by using the row signals G2, G3 and G4 sequentially provided for respective horizontal periods, and controls the driving currents O2, O3 and O4, corresponding to the levels of the sampling voltages, to flow for light emission.

The sampling voltages generated by the current control integrated circuit T11 by using the row signals G2, G3 and G4 are maintained till the horizontal periods HL2, HL3 and HL4 of the next frame FR2. Therefore, the current control integrated circuit T11 maintains the levels of the driving currents O2, O3 and O4 of the light emitting diode channels CH21, CH31 and CH41 to maintain the brightnesses of the levels of the respective horizontal periods, corresponding to the column signal D1, till the next frame FR2.

It may be understood that the sampling voltages sampled by the current control integrated circuit T11 by using the respective row signals G2, G3 and G4 are maintained for one frame period as described above and are reset to have levels corresponding to a current column signal by the unit of frame.

In other words, the current control integrated circuit T11 generates the sampling voltages for the respective light emitting diode channels CH11, CH**2*l*, CH3*l* and CH4*l* in correspondence to the column signal D1 and the row signals G1 to G4, and controls, by using the sampling voltages, driving currents between the control terminals TO1 to TO4 corresponding to the low sides of the respective light emitting diode channels CH11, CH21, CH31 and CH41** and the ground GND.

Figure 8:
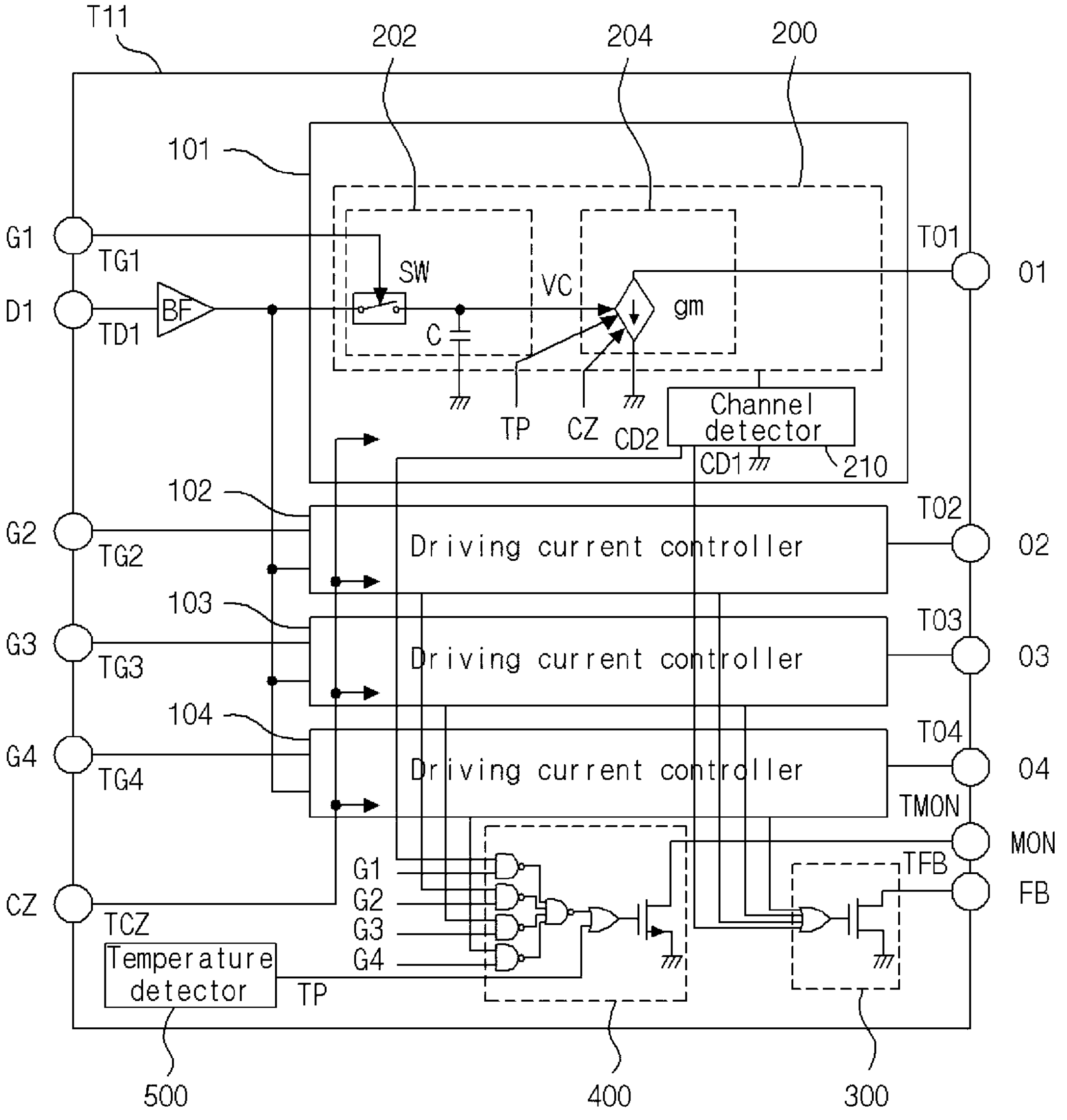
FIG. 8 is a detailed block diagram illustrating an example of the current control integrated circuit.

For the aforementioned operation, the current control integrated circuit T11 may be implemented as illustrated in FIG. 8.

The current control integrated circuit T11 is configured to include a buffer BF, driving current controllers 101 to 104, a feedback signal provider 300, a monitor signal provider 400 and a temperature detector 500.

The buffer BF is configured to receive the column signal D1 through the column input terminal TD1 and provide the received column signal D1 in common to the driving current controllers 101 to 104. The buffer BF is illustrated as being configured in common for the driving current controllers 101 to 104, but may be designed to be built in each of the driving current controllers 101 to 104.

Each of the driving current controllers 101 to 104 is configured to generate a sampling voltage VC by sampling the column signal D1 by using the row signal G1, G2, G3 or G4 of a corresponding light emitting diode channel and to control, by using the sampling voltage VC, each of the driving currents O1 to O4 of the light emitting diode channels CH11, CH21, CH31 and CH41 connected to the control terminals T01 to TO4.

Constructions and operations of the driving current controllers 101 to 104 will be described by representatively referring to the driving current controller 101. It may be understood that the configurations of the driving current controllers 102 to 104 are the same as the configuration of the driving current controller 101.

The driving current controller 101 is configured to receive the column signal D1, the row signal G1, a temperature detection signal TP and the zoom control signal CZ and to control the driving current O1.

The driving current controller 101 includes an internal circuit 200 and a channel detector 210.

In the case of FIG. 8, the internal circuit 200 includes a holding circuit 202 and a channel current controller 204.

The holding circuit 202 is configured to generate the sampling voltage VC by sampling the column signal D1 by using the row signal G1 and to hold the sampling voltage VC. To this end, the holding circuit 202 includes a switch SW which switches the transfer of the column signal D1 by the row signal G1 and a capacitor C which generates the sampling voltage VC by sampling the column signal D1 transferred through the switch SW. The capacitor C performs sampling of charging the column signal D1 transferred through the switch SW, while the row signal G1 is enabled, and stores and generates the sampling voltage VC corresponding to a sampling result. The capacitor C may provide the sampling voltage VC to the channel current controller 204 while holding the sampling voltage VC.

The channel current controller 204 is configured to control an amount of the driving current O1 for the light emission of the light emitting diode channel CH11 connected to the control terminal T01, by using the sampling voltage VC of the capacitor C. The channel current controller 204 may be configured to include a dependent current source gm which controls the flow of the driving current O1 so that the driving current O1 has an amount controlled to the level of the sampling voltage VC. The dependent current source gm may receive the temperature detection signal TP and the zoom control signal CZ, and may be configured to block the flow of the driving current O1 by the temperature detection signal TP or allow the flow of the driving current O1 amplified according to the level of the zoom control signal CZ.

The channel detector 210 may be configured to detect a voltage between the control terminal TO1 and the ground GND and provide a first detection signal CD1 and a second detection signal CD2.

The first detection signal CD1 is a result of determining whether a voltage between the control terminal TO1 and the ground GND is equal to or lower than a first level, and the second detection signal CD2 is a result of determining whether a voltage between the control terminal 101 and the ground GND is equal to or lower than a second level lower than the first level. The first detection signal CD1 and the second detection signal CD2 may be provided to have high levels when the conditions are satisfied.

The driving current O1 may decrease when the light emission voltage VLED applied to the light emitting diode channel CH11 is lower than a lowest light emission voltage. Therefore, when the light emission voltage VLED is regulated to be equal to or higher than the lowest light emission voltage, the driving current O1 is also regulated, and as a result, the brightness of the light emitting diode channel CH11 may be constantly maintained. The first detection signal CD1 is to regulate the driving current O1. When the voltage between the control terminal TO1 and the ground GND is lowered to be equal to or lower than a preset level (e.g., 0.5V), the first detection signal CD1 may be provided by being activated to a high level. The first detection signal CD1 may be provided to the feedback signal provider 300.

When an open or a short occurs in the light emitting diode channel CH11, the driving current O1 may be blocked or may flow abnormally a lot. In this case, when the voltage between the control terminal TO1 and the ground GND becomes equal to or lower than a preset level (e.g., 0.2V) which is lower than the first level, the second detection signal CD2 may be provided by being activated to a high level. The second detection signal CD2 may be provided to the monitor signal provider 400.

The feedback signal provider 300 is configured to control the feedback signal FB by controlling the current between the feedback terminal TFP and the ground GND in response to each of the first detection signals CD1 of the driving current controllers 101 to 104.

To this end, the feedback signal provider 300 may include an OR gate and a current driving transistor. The OR gate is to control the gate of the current driving transistor in response to at least one of the first detection signals CD1 of the driving current controllers 101 to 104. The current driving transistor may control the feedback signal FB to a low level in response to a high level output of the OR gate, and may control the feedback signal FB to a high level in response to a low level output of the OR gate.

Namely, when the driving current of at least one of the driving current controllers 101 to 104 becomes lower than a preset level, the feedback signal provider 300 may control the feedback signal FB to a low level.

The temperature detector 500 is configured to provide the temperature detection signal TP by sensing the temperature of the current control integrated circuit T11 configured as a chip. For example, when the temperature of the current control integrated circuit T11 rises to a preset temperature or higher, the temperature detector 500 may provide the temperature detection signal TP which is activated to a high level.

When the temperature detection signal TP is activated as the temperature detector 500 detects a temperature equal to or higher than the preset temperature, a current flow of the dependent current source gm is blocked by the activated temperature detection signal TP. Conversely, when the temperature detection signal TP is deactivated as the temperature detector 500 detects a temperature lower than the preset temperature, a current flow of the dependent current source gm is not influenced by the temperature detection signal TP. The temperature detector 500 is to protect an integrated circuit and a backlight device from overheating, by controlling a driving current flowing through a light emitting diode channel to be blocked or be allowed.

The monitor signal provider 400 is configured to receive the second detection signals CD2 of the driving current controllers 101 to 104 and the row signals G1 to G4 and to control the monitor signal MON by controlling the current between the monitor terminal TMON and the ground GND when the second detection signal CD2 of at least one driving current controller and a corresponding row signal are activated to high levels.

Furthermore, the monitor signal provider 400 is configured to control the monitor signal MON by controlling the current between the monitor terminal TMON and the ground GND according to the temperature detection signal TP.

To this end, the monitor signal provider 400 may include an OR gate circuit and a current driving transistor. The OR gate circuit may be configured to turn on the current driving transistor when the second detection signal CD2 of at least one driving current controller and a corresponding row signal are activated to high levels or the temperature detection signal TP is activated to a high level. To this end, the OR gate circuit may include first NAND gates which compare the second detection signals CD2 of the respective driving current controllers 101 to 104 and the row signals G1 to G4, a second NAND gate which compares the outputs of the first NAND gates, and an OR gate which performs an OR logic operation on the output of the second NAND gate and the temperature detection signal TP. The OR gate circuit may be variously implemented by a fabricator, and thus, the detailed description of the configuration and operation thereof is omitted. The current driving transistor may be configured using an NMOS transistor.

By the above configuration, when the row signal G1, G2, G3 or G4 of at least one of the driving current controllers 101 to 104 is enabled to a high level, if the second detection signal CD2 of the corresponding driving current controller 101, 102, 103 or 104 is activated to a high level, the monitor signal provider 400 may control the monitor signal MON to a low level by the turn-on of the current driving transistor. Also, when the temperature detection signal TP is activated to a high level, the monitor signal provider 400 may control the monitor signal MON to a low level by the turn-on of the current driving transistor.

The monitor signal MON may be used for control in an abnormal operation of the backlight device, by being provided to a timing controller (not illustrated) or a separate application.

The zoom control signal CZ is to control a resolution of a low driving current band of the light emitting diode channel controlled by the sampling voltage VC. It may be understood that when the resolution of a driving current is increased by the zoom control signal CZ, the resolution of a brightness that can be expressed by the driving current is increased.

The zoom control signal CZ may be provided from outside the current control integrated circuit T11.

The zoom control signal CZ may be provided as the same value for all light emitting diode channels of the backlight board 40 or light emitting diode channels of a control unit.

The zoom control signal CZ may be provided for each light emitting diode channel to have a value corresponding to data for light emission, that is, a column signal, for each light emitting diode channel.

A brightness range expressed by a column signal may be divided into a high current band brighter than a predetermined reference brightness and a low current band lower than the predetermined reference brightness, and the zoom control signal CZ may be provided as different values for the high current band and the low current band.

That is to say, the zoom control signal CZ may be provided to have a value for controlling a driving current so that the low current band has a higher resolution than the high current band.

For example, the zoom control signal CZ may be provided as 0V for a driving current of 10 mA or more having a high brightness level, and may be provided as 5V for a driving current of less than 10 mA having a low brightness level. When the zoom control signal CZ is provided as 0V, a driving current may be controlled to a basic current range in correspondence to the basic voltage range of a column signal D. When the zoom control signal CZ is provided as 5V, a driving current may be finely controlled to a driving current ranging from 0 mA to 10 mA in a voltage range wider than the basic voltage range of the column signal D. In other words, when the zoom control signal CZ is provided as 5V, the amount of a driving current having a low brightness may be more finely controlled to have a high resolution.

As described above, the zoom control signal CZ may be provided such that the zoom control signal CZ has a value for controlling a driving current corresponding to a current band equal to or higher than a predetermined reference to have a first resolution and has a value for controlling a driving current corresponding to a current band lower than the predetermined reference to have a second resolution higher than the first resolution.

Namely, the resolution of the expression range of the brightness of a specific driving current may be increased by the zoom control signal CZ.

In the above-described embodiment illustrated in FIGS. 1 to 8, the brightness level of a light emitting diode channel may control the driving current of the light emitting diode channel by the level, that is, the amplitude, of a column signal.

The operation of the backlight board 40 according to the present disclosure may be understood by the above description of FIGS. 1 to 8.

The backlight device according to the present disclosure may include a plurality of backlight boards 40 for providing backlight, and each backlight board 40 includes a plurality of current control integrated circuits and a plurality of light emitting diode channels.

In the backlight board 40, a column signal is inputted to a current control integrated circuit, and a light emitting diode channel emits light to have a brightness according to the current control of the current control integrated circuit in response to the column signal.

All light emitting diode channels should emit light to have the same brightness for the same column data. However, the brightnesses of the light emitting diode channels may vary for the same column data by a current deviation by the current control integrated circuit.

It may be understood that the current deviation is caused by the offset voltage of the buffer BF in the current control integrated circuit T11.

In addition, it may be understood that the current deviation is caused by a deviation in the gain of the dependent current source gm which contributes to the driving current of a light emitting diode channel.

The above-described deviation in the gain of the dependent current source gm may be differently formed for each light emitting diode channel, and serves as a factor that causes a current deviation in a driving current for the light emission of the light emitting diode channels of the backlight board 40.

As a result, the light emitting diode channels may emit light with different brightnesses in response to the same column data.

The current deviation caused by the above reason may exert a greater influence on the uniformity in the brightness of a light emitting diode channel for a current of a low current band than a current of a high current band.

The present disclosure discloses an embodiment for compensating for the above-described current deviation.

A light emitting block may be defined for the description of the present disclosure. The light emitting block is a basic unit for controlling dimming, and may be understood as including at least one light emitting diode channel included in a preset zone on the backlight board 40. The embodiment of the present disclosure exemplifies for the sake of convenience in explanation that one light emitting diode channel forms one light emitting block. By the above exemplification, hereinafter, a light emitting diode channel will be described as a light emitting block. It may be understood that light emitting blocks have the above-described current deviation.

In the embodiment of the present disclosure, in order to resolve the current deviation, offset correction data corresponding to a deviation in the offset voltage of the buffer BF and gain correction data corresponding to a deviation in the gain of the dependent current source gm may be generated for each light emitting block. The offset voltage of the buffer BF may be controlled by the offset correction data and the gain of the dependent current source gm may be controlled by the gain correction data, and as a result, the current deviation may be resolved.

Current control integrated circuits are manufactured using a wafer. The wafer undergoes a plurality of semiconductor processes so that a current control integrated circuit may be realized for each of a plurality of cell regions, and when the current control integrated circuit is formed for the cell region on the wafer, current control integrated circuits may be tested at a wafer level.

The wafer level test of a plurality of current control integrated circuits is conducted by test equipment. The test equipment may calculate current deviations by a deviation in the offset voltage of a current control integrated circuit and a deviation in the gain of a dependent current source, may store calculated values in a memory thereof, and after the test is completed, may update the values in a memory unit included in the current control integrated circuit.

After, as described above, offset correction data and gain correction data are updated in the memory of the memory unit of each current control integrated circuit, the current control integrated circuit may be individually mass-produced through sawing of the wafer and packaging of a chip.

The embodiment for resolving a current deviation as described above may be described with reference to FIG. 9.

Figure 9:
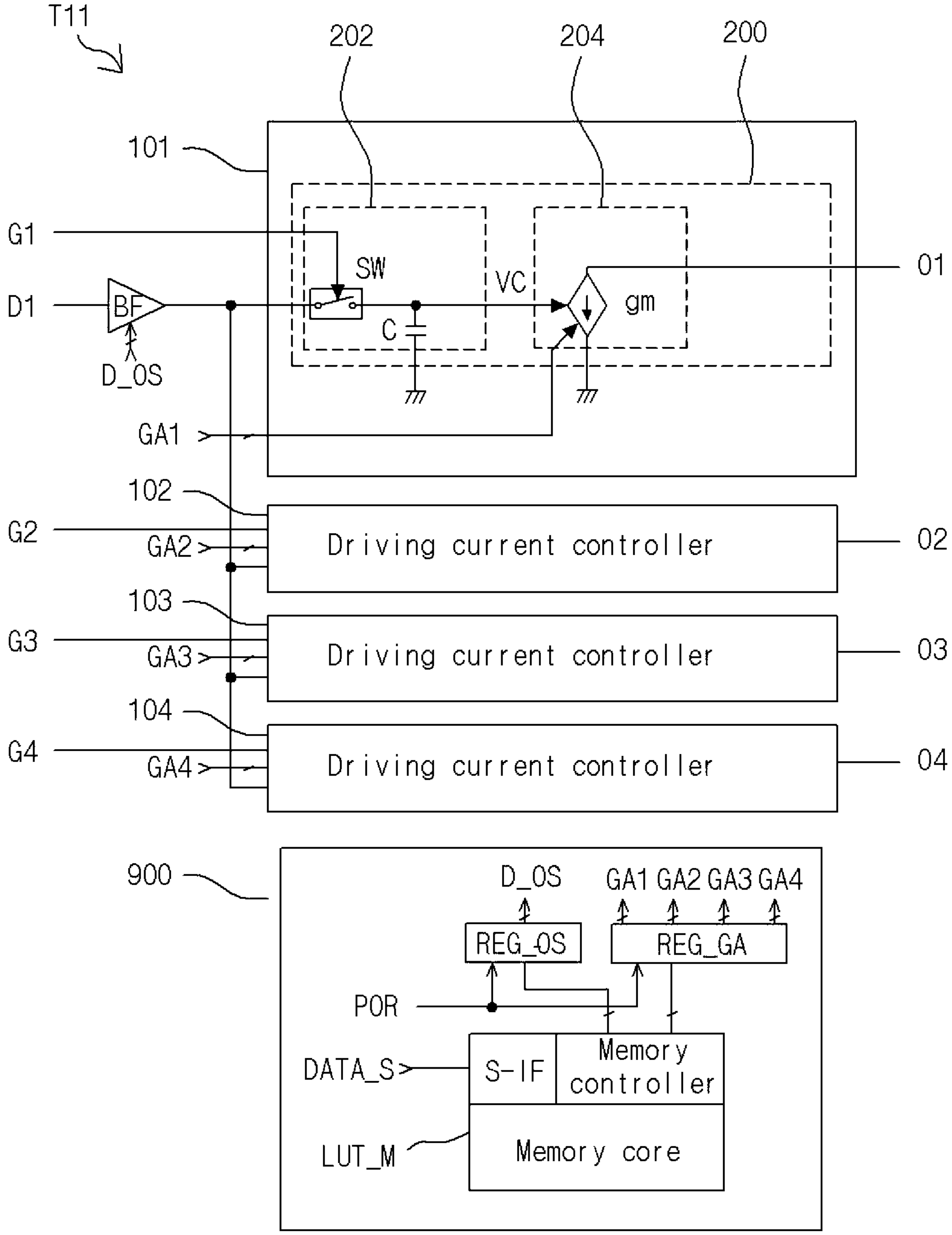
FIG. 9 is a detailed block diagram of a current control integrated circuit.

FIG. 9 illustrates one current control integrated circuit T11.

The current control integrated circuit T11 of FIG. 9 may include a buffer BF, a plurality of driving current controllers 101 to 104, and a memory unit 900.

Figure 10:
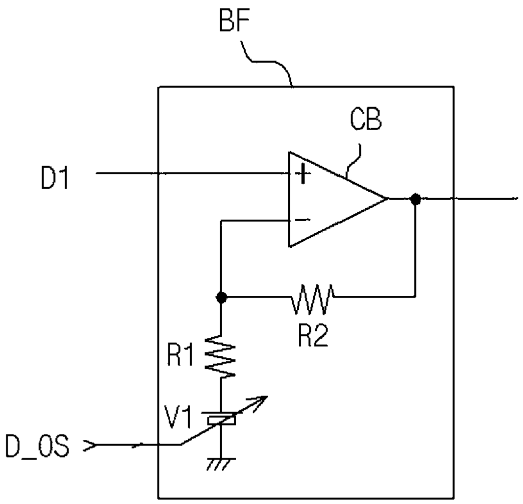
FIG. 10 is a detailed circuit diagram illustrating an example of a buffer.

It may be understood that the buffer BF has the same configuration and function as in FIG. 8. However, unlike in FIG. 8, the buffer BF of FIG. 9 may receive offset correction data D_OS, and may have an offset voltage controlled according to the value of the offset correction data D_OS. The buffer BF of FIG. 9 may include an offset controller V1 as illustrated in FIG. 10, in order for the control of an offset voltage. The offset controller V1 may control the offset voltage of the buffer BF in response to the offset correction data D_OS. The configuration and operation of the buffer BF of FIG. 10 will be described later.

Figure 11:
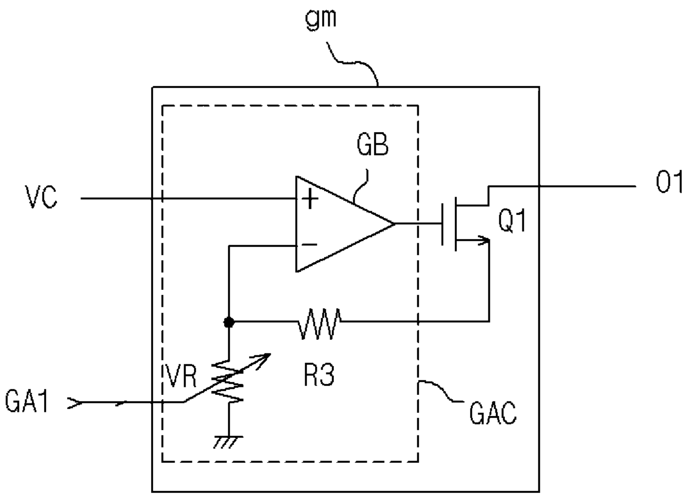
FIG. 11 is a detailed circuit diagram illustrating an example of a dependent current source.

The plurality of driving current controllers 101 to 104 are configured to receive a column signal D1 outputted from the buffer BF and row signals G1 to G4 corresponding to a plurality of light emitting blocks of a control unit and to control driving currents O1 to O4 for the light emission of the light emitting blocks. It may be understood that the plurality of driving current controllers 101 to 104 have the same configuration and function as in FIG. 8. However, unlike in FIG. 8, in the driving current controllers 101 to 104 of FIG. 9, dependent current sources gm may be configured to further receive gain correction data GA1 to GA4. The dependent current source gm of FIG. 9 may include a gain controller VR as illustrated in FIG. 11, in order for the control of a gain for driving a driving current. The configuration and operation of the dependent current source gm of FIG. 11 will be described later.

The memory unit 900 stores the offset correction data D_OS for controlling a deviation in the offset voltage of the buffer BF and the gain correction data GA1 to GA4 for controlling deviations in the gains of the dependent current sources gm of the plurality of driving current controllers 101 to 104.

The memory unit 900 may store, for the plurality of light emitting blocks, a value corresponding to the difference between a voltage level of a column signal reaching a preset target value of a driving current and a reference voltage level corresponding to the target value, as the offset correction data D_OS.

For example, a target value of a driving current may be set to 200 uA, and a reference voltage level corresponding to the target value may be defined as 100 mV. In order to calculate the offset correction data D_OS, a driving current is raised from a lowest level to the target value 200 uA, and the difference between the voltage of a column signal corresponding to that the driving current reaches the target value 200 uA and the reference voltage level 100 mV is calculated. The difference may be set as the offset correction data D_OS.

The memory unit 900 may calculate, for each of the plurality of light emitting blocks, a slope value expressing the proportional relationship between a change in the driving current within a preset range and a change in the voltage of the column signal, and may store the difference between the calculated slope value and a preset reference slope value, as each of the gain correction data GA1 to GA4 of the dependent current sources gm of the plurality of driving current controllers 101 to 104.

For example, a slope value expressing the proportional relationship between a change in the driving current within a range of 100 uA to 500 uA and a change in the voltage of the column signal is calculated. When the preset reference slope value is, for example, "1," the difference between a calculated slope value and the reference slope value preset to "1" may be set as the gain correction data of the dependent current source gm of a corresponding driving current controller.

The memory unit 900 is configured to include a memory LUT_M and registers REG_OS and REG_GA.

The memory LUT_M may be configured to include a serial interface section S-IF which receives update data, a memory core which stores data, and a memory controller which controls the output of data. The memory LUT_M may be configured using a nonvolatile memory. The memory LUT_M may be configured to store the offset correction data D_OS and the gain correction data GA1 to GA4 in the form of a lookup table and to provide corresponding data in response to requests of the registers REG_OS and REG_GA.

The register REG_OS is to read and store the offset correction data of the memory LUT_M and to provide the stored offset correction data D_OS to the offset controller V1 of the buffer BF.

The register REG_GA is to read and store the gain correction data of the memory LUT_M and to provide the gain correction data GA1 to GA4 to the dependent current sources gm of the respective driving current controllers 101 to 104.

The registers REG_OS and REG_GA may receive a power-on reset signal POR, and may be configured to execute reading and providing of data of the memory LUT_M at a power-on time point by the power-on reset signal POR.

The memory LUT_M may receive the offset correction data D_OS and the gain correction data GA1 to GA4 from the outside at a power-on time point, and may update the received data in the lookup table.

The buffer BF which receives the offset correction data D_OS from the register REG_OS may be configured as illustrated in FIG. 10.

Referring to FIG. 10, the buffer BF is configured to include an amplifier CB and the offset controller V1.

In detail, the amplifier CB may include a first input terminal (a positive input terminal, +) which receives the column signal D1, a second input terminal (a negative input terminal, −) to which an offset voltage is applied, and an output terminal which outputs an offset voltage-subtracted column signal.

A resistor R2 for the feedback of the column signal to be outputted is configured between the output terminal of the amplifier CB and the second input terminal.

A resistor R1 which forms an offset voltage may be configured on the second input terminal of the amplifier CB, and it may be understood that the resistor R1 is equivalently configured.

The offset controller V1 is connected to the resistor R1. The offset controller V1 may receive the offset correction data D_OS, and may control the offset voltage of the second input terminal in response to the offset correction data D_OS.

To this end, the offset controller V1 may be configured to have a resistance value which is changed in response to the offset correction data D_OS, and may control the offset voltage by the resistance value. The offset controller V1 in which a resistance value is changed in response to the offset correction data D_OS may be configured by using, for example, a resistor string which is configured by resistors capable of being individually selected. The offset controller V1 may be configured to control an offset voltage as a resistor to act a resistor is selected according to the offset correction data D_OS.

The dependent current source gm which receives the gain correction data GA1, GA2, GA3 or GA4 from the register REG_GA may be configured as illustrated in FIG. 11.

Referring to FIG. 11, the dependent current source gm includes an amplifier circuit GAC and a transistor Q1. The amplifier circuit GAC is configured to amplify a sampling voltage VC according to a gain and output an output. The transistor Q1 is connected to control the amount of a driving current O1 in response to the output of the amplifier circuit GAC.

The amplifier circuit GAC is configured to include the gain controller VR and an amplifier GB. The gain controller VR is configured to control the gain of the amplifier GB by having a resistance value which is changed in response to the gain correction data GA1. The amplifier GB is configured to have a first input terminal (a positive input terminal, +) which receives the sampling voltage VC, a second input terminal (a negative input terminal, −) which is connected in common to the gain controller VR and the source of the transistor Q1, and an output terminal which provides an output corresponding to the voltage difference between the first input terminal and the second input terminal.

A resistor R3 for the feedback of the source of the transistor Q1 is configured between the output terminal of the amplifier GB and the second input terminal.

As a result, the amplifier CB may have a gain corresponding to a change in the resistance value of the gain controller VR, and may control the amount of the driving current O1 by the gain changed by the gain correction data GA1.

Figure 12:
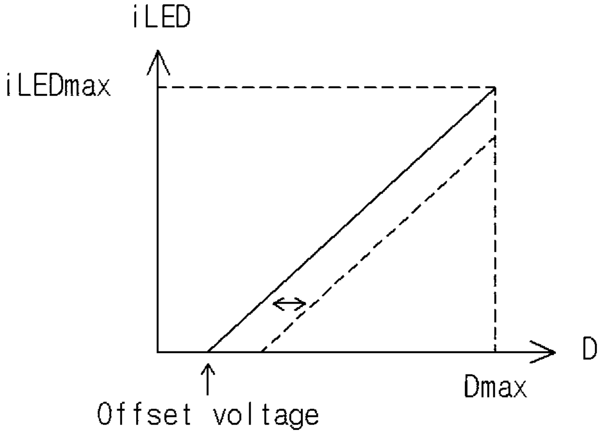
FIG. 12 is a graph explaining correction of an offset voltage by offset correction data.

In the embodiment of the present disclosure, if the offset voltage of the buffer BF is changed without a change in the gain of the dependent current source gm, as shown in FIG. 12, only the level of the offset voltage is changed, and the change ratio between a column signal and a driving current, that is, a gain, is fixed.

Figure 13:
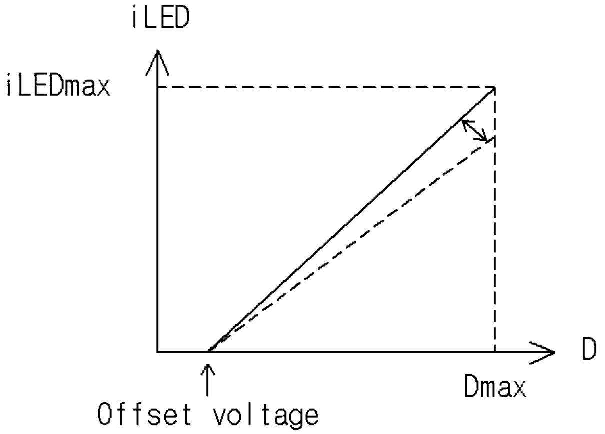
FIG. 13 is a graph explaining correction of a gain by gain correction data.

In the embodiment of the present disclosure, if the gain of the dependent current source gm is changed without a change in the offset voltage of the buffer BF, as shown in FIG. 13, the change ratio between a column signal and a driving current, that is, a gain, is changed, and the level of the offset voltage is fixed.

Figure 14:
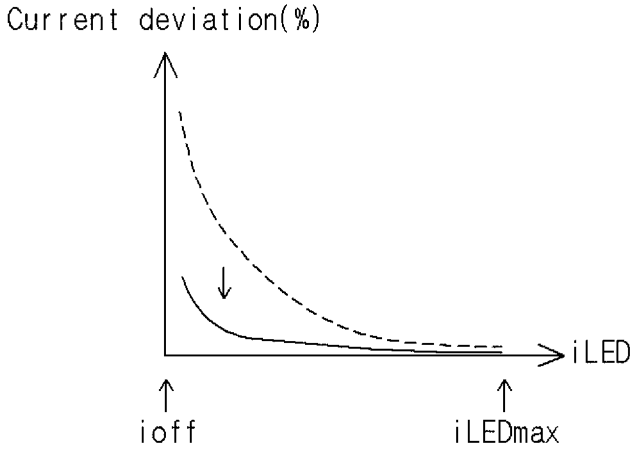
FIG. 14 is a graph explaining an example of reducing a current deviation according to the present disclosure.

FIG. 14 is a graph explaining an example of reducing a current deviation according to the present disclosure.

In the present disclosure, by the embodiment of FIG. 9, the offset voltage of the buffer BF and the gain of the dependent current source gm may be changed using the offset correction data D_OS and the gain correction data GA1 to GA4, and as a result, the current deviation of a driving current may be improved as shown in FIG. 14.

Therefore, all the light emitting blocks may emit light to have the same brightness for the same color data.

Figure 15:
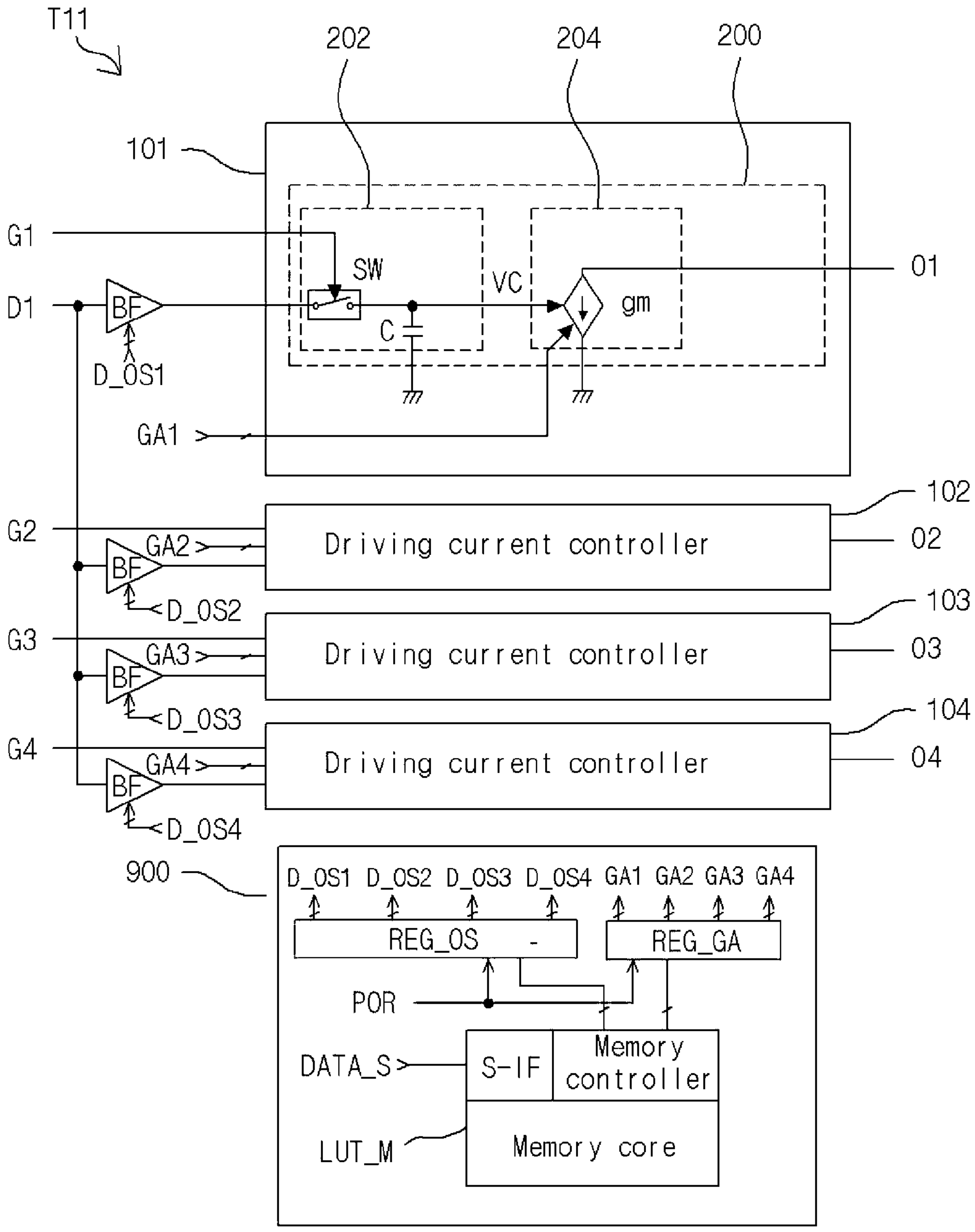
FIG. 15 is a detailed block diagram explaining a current control integrated circuit in accordance with another embodiment of the present disclosure.

Meanwhile, the present disclosure may be implemented by being modified to include a plurality of buffers BF in one current control integrated circuit T11. An embodiment for this may be understood with reference to FIG. 15. In FIG. 15, the same parts as those of FIG. 9 are denoted by the same reference symbols, and repeated descriptions are omitted.

In FIG. 15, the plurality of buffers BF are configured to receive in common the column signal D1. The plurality of driving current controllers 101 to 104 are configured to correspond to the plurality of buffers BF. That is to say, each of the driving current controllers 101 to 104 is configured to receive a column signal outputted from a corresponding buffer BF.

Since the plurality of buffers BF may have the same configuration as the buffer BF described above with reference to FIGS. 9 and 10, repeated descriptions thereof are omitted.

Each buffer BF may have an offset voltage controlled by the offset controller V1, and may provide an offset voltage-subtracted column signal to a corresponding driving current controller 101, 102, 103 or 104.

The memory unit 900 stores offset correction data for controlling deviations in the offset voltages of a plurality of buffers. The memory unit 900 may store, for the buffers BF and the plurality of light emitting blocks, a value corresponding to the difference between a voltage level of the column signal D1 reaching a preset target value of a driving current and a reference voltage level corresponding to the target value, as each of offset correction data D_OS1 to D_OS4.

The memory unit 900 may store the gain correction data GA1 to GA4 for controlling deviations in the gains of the dependent current sources gm of the plurality of driving current controllers 101 to 104.

The memory LUT_M of the memory unit 900 may be configured to store the offset correction data D_OS1 to D_OS4 and the gain correction data GA1 to GA4 in the form of a lookup table and to provide corresponding data in response to requests of the registers REG_OS and REG_GA.

The register REG_OS is to read and store the offset correction data D_OS1 to D_OS4 of the memory LUT_M and to provide the stored offset correction data D_OS1 to D_OS4 to the offset controllers V1 of the plurality of buffers BF.

The register REG_GA is to read and store the gain correction data of the memory LUT_M and to provide the gain correction data GA1 to GA4 to the dependent current sources gm of the respective driving current controllers 101 to 104.

Even in the embodiment of FIG. 15, the offset voltage of the buffer BF and the gain of the dependent current source gm may be changed using the offset correction data D_OS1 to D_OS4 and the gain correction data GA1 to GA4, and as a result, the current deviation of a driving current may be improved as shown in FIG. 14.

As is apparent from the above description, in the present disclosure, the sampling voltage of a capacitor which is obtained by sampling a column signal may be maintained for a frame period, and the driving current of a light emitting diode channel may be controlled to maintain light emission by the unit of frame by the sampling voltage maintained for the frame period. As a result, it is possible to reduce or prevent flicker caused by the backlight device of a display.

Also, in the present disclosure, as a current control integrated circuit is configured for each control unit including a plurality of light emitting diode channels, it is possible to ensure the convenience of design and fabrication for controlling the driving currents of light emitting diode channels on a backlight board.

Further, in the present disclosure, by preventing the current deviation of a light emitting diode channel due to an offset voltage likely to act relatively greatly in a low current band, it is possible to improve gray uniformity and dark uniformity evaluated in the low current band.

In addition, in the present disclosure, by storing current deviation compensation data in a storage and compensating column data by the current deviation compensation data, the current deviations of the light emitting diode channels of the backlight device due to offset voltages may be compensated for, thereby improving light emission uniformity.

The invention claimed is:

1. A current control integrated circuit of a backlight device for display, comprising:

a buffer configured to receive a column signal, and including an offset controller;

a plurality of driving current controllers configured to receive the column signal outputted from the buffer and row signals corresponding to a plurality of light emitting blocks of a control unit, and control driving currents for light emission of the light emitting blocks; and a memory unit configured to store offset correction data for controlling a deviation in an offset voltage of the buffer, wherein each driving current controller generates a sampling voltage by sampling the column signal by using the row signal, and controls the driving current of the light emitting block by using the sampling voltage, wherein the offset controller controls the offset voltage in response to the offset correction data, and wherein the buffer has the offset voltage which is controlled by the offset controller, and provides the column signal from which the offset voltage is subtracted, to the plurality of driving current controllers.

2. The current control integrated circuit according to claim 1, wherein the buffer comprises:

an amplifier including a first input terminal which receives the column signal, a second input terminal to which the offset voltage is applied, and an output terminal which outputs the column signal from which the offset voltage is subtracted; and the offset controller configured to control the offset voltage of the second input terminal in response to the offset correction data.

3. The current control integrated circuit according to claim 2, wherein the offset controller has a resistance value which is changed in response to the offset correction data, and controls the offset voltage by the resistance value.

4. The current control integrated circuit according to claim 1, wherein the memory unit stores, for the plurality of light emitting blocks, a value corresponding to a difference between a voltage level of the column signal reaching a preset target value of the driving current and a reference voltage level corresponding to the target value, as the offset correction data.

5. The current control integrated circuit according to claim 1, wherein the memory unit comprises:

a memory configured to store the offset correction data; and a register configured to read and store the offset correction data of the memory, and provide the offset correction data to the offset controller of the buffer.

6. The current control integrated circuit according to claim 5, wherein the register executes reading and providing of data of the memory at a power-on time point.

7. The current control integrated circuit according to claim 5, wherein the memory receives the offset correction data from an outside at a power-on time point, and updates the received offset correction data.

8. The current control integrated circuit according to claim 1, wherein the driving current controller comprises:

a holding circuit configured to generate the sampling voltage by sampling the column signal by using the row signal, and hold the sampling voltage; and a channel current controller configured to control the driving current of the light emitting block by using the sampling voltage.

9. The current control integrated circuit according to claim 8, wherein the channel current controller includes a dependent current source which controls the driving current, the memory unit further stores gain correction data for controlling a deviation in a gain of the dependent current source, and the dependent current source has a gain which is controlled to correspond to the gain correction data, and controls an amount of the driving current in response to the gain.

10. The current control integrated circuit according to claim 9, wherein the memory unit calculates, for each of the plurality of light emitting blocks, a slope value expressing a proportional relationship between a change in the driving current within a preset range and a change in a voltage of the column signal, and stores a difference between the calculated slope value and a preset reference slope value, as the gain correction data.

11. The current control integrated circuit according to claim 10, wherein the memory unit comprises:

a memory configured to store the offset correction data and the gain correction data;

a first register configured to read and store the offset correction data of the memory, and provide the offset correction data to the offset controller of the buffer; and a second register configured to read and store the gain correction data of the memory, and provide the gain correction data to the dependent current source of each driving current controller.

12. The current control integrated circuit according to claim 11, wherein the first register and the second register execute reading and providing of data of the memory at a power-on time point.

13. The current control integrated circuit according to claim 11, wherein the memory receives the offset correction data and the gain correction data from an outside at a power-on time point, and updates the received offset correction data and gain correction data.

14. The current control integrated circuit according to claim 9, wherein the dependent current source comprises:

an amplifier circuit configured to amplify the sampling voltage according to the gain, and output an output; and a transistor configured to control an amount of the driving current in response to the output of the amplifier circuit, wherein the amplifier circuit comprises:

a gain controller having a resistance value which is changed in response to the gain correction data; and an amplifier having a first input terminal which receives the sampling voltage, a second input terminal which is connected in common to the gain controller and a source of the transistor, and an output terminal which provides an output corresponding to a voltage difference between the first input terminal and the second input terminal, and wherein the amplifier has the gain corresponding to a change in the resistance value of the gain controller.

15. The current control integrated circuit according to claim 1, wherein the plurality of driving current controllers control the driving currents of low sides of the plurality of light emitting blocks.

16. A current control integrated circuit of a backlight device for display, comprising:

a buffer configured to receive a column signal;

a plurality of driving current controllers configured to receive the column signal outputted from the buffer and row signals corresponding to a plurality of light emitting blocks of a control unit and to control driving currents for light emission of the light emitting blocks, and each including a dependent current source which controls the driving current; and a memory unit configured to store gain correction data for controlling a deviation in a gain of the dependent current source, wherein each driving current controller generates a sampling voltage by sampling the column signal by using the row signal, and controls the driving current of the light emitting block by using the sampling voltage, and wherein the dependent current source controls an amount of the driving current in response to a gain.

17. The current control integrated circuit according to claim 16, wherein the driving current controller comprises:

a holding circuit configured to generate the sampling voltage by sampling the column signal by using the row signal, and hold the sampling voltage; and a channel current controller including the dependent current source, and configured to control the driving current of the light emitting block by using the sampling voltage, and wherein the dependent current source has a gain which is controlled to correspond to the gain correction data, and controls an amount of the driving current in response to the gain.

18. The current control integrated circuit according to claim 16, wherein the memory unit calculates, for each of the plurality of light emitting blocks, a slope value expressing a proportional relationship between a change in the driving current within a preset range and a change in a voltage of the column signal, and stores a difference between the calculated slope value and a preset reference slope value, as the gain correction data.

19. The current control integrated circuit according to claim 16, wherein the memory unit comprises:

a memory configured to store the gain correction data; and a register configured to read and store the gain correction data of the memory, and provide the gain correction data to the dependent current source of each driving current controller.

20. The current control integrated circuit according to claim 19, wherein the register executes reading and providing of data of the memory at a power-on time point.

21. The current control integrated circuit according to claim 19, wherein the memory receives offset correction data and the gain correction data from an outside at a power-on time point, and updates the received offset correction data and gain correction data.

22. The current control integrated circuit according to claim 17, wherein the dependent current source comprises:

an amplifier circuit configured to amplify the sampling voltage according to the gain, and output an output; and a transistor configured to control an amount of the driving current in response to the output of the amplifier circuit, wherein the amplifier circuit comprises:

a gain controller having a resistance value which is changed in response to the gain correction data; and an amplifier having a first input terminal which receives the sampling voltage, a second input terminal which is connected in common to the gain controller and a source of the transistor, and an output terminal which provides an output corresponding to a voltage difference between the first input terminal and the second input terminal, and wherein the amplifier has the gain corresponding to a change in the resistance value of the gain controller.

23. A current control integrated circuit of a backlight device for display, comprising:

a plurality of buffers configured to receive in common a column signal, and each including an offset controller;

a plurality of driving current controllers configured in correspondence to the plurality of buffers, and configured to receive the column signal outputted from the corresponding buffers and row signals corresponding to a plurality of light emitting blocks of a control unit, and control driving currents for light emission of the light emitting blocks; and a memory unit configured to store offset correction data for controlling deviations in offset voltages of the plurality of buffers, wherein each driving current controller generates a sampling voltage by sampling the column signal by using the row signal, and controls the driving current of the light emitting block by using the sampling voltage, and wherein the offset controller controls the offset voltage in response to the offset correction data, and wherein each buffer has the offset voltage which is controlled by the offset controller, and provides the column signal from which the offset voltage is subtracted, to the driving current controller.

24. The current control integrated circuit according to claim 23, wherein the buffer comprises:

an amplifier including a first input terminal which receives the column signal, a second input terminal to which the offset voltage is applied, and an output terminal which outputs the column signal from which the offset voltage is subtracted; and the offset controller configured to control the offset voltage of the second input terminal in response to the offset correction data.

25. The current control integrated circuit according to claim 24, wherein the offset controller has a resistance value which is changed in response to the offset correction data, and controls the offset voltage by the resistance value.

26. The current control integrated circuit according to claim 23, wherein the memory unit stores, for the buffers and the plurality of light emitting blocks, a value corresponding to a difference between a voltage level of the column signal reaching a preset target value of the driving current and a reference voltage level corresponding to the target value, as the offset correction data.

27. The current control integrated circuit according to claim 23, wherein the memory unit comprises:

a memory configured to store the offset correction data; and a register configured to read and store the offset correction data of the memory, and provide the offset correction data to the offset controller of the buffer.

* * * * *